United States Patent [19]

Aldred et al.

[11] 4,340,517

[45] Jul. 20, 1982

[54] POLYMER/BITUMINOUS MATERIAL BLENDS, PROCESS FOR MAKING ARTICLES FROM SUCH BLENDS AND ARTICLES MADE BY THE PROCESS

[75] Inventors: Alan C. G. Aldred, North Cheam; Brian Weeks, Epsom, both of England

[73] Assignee: The British Petroleum Company Limited, London, England

[21] Appl. No.: 216,649

[22] Filed: Dec. 15, 1980

[30] Foreign Application Priority Data

Dec. 19, 1979 [GB] United Kingdom ................ 7943645

[51] Int. Cl.³ .............................................. C08L 95/00
[52] U.S. Cl. ...................................... 524/59; 524/68; 524/587
[58] Field of Search ................ 260/28.5 D, 28.5 AS, 260/28.5 A; 106/273 R; 525/212

[56] References Cited

U.S. PATENT DOCUMENTS

| | | | |
|---|---|---|---|
| 2,752,316 | 6/1956 | Bolt et al. ...................... | 260/28.5 D |
| 2,930,726 | 3/1960 | Jones et al. ..................... | 260/28.5 D |
| 3,050,483 | 8/1962 | Kalil .............................. | 260/28.5 D |
| 4,098,739 | 7/1978 | Westermann ................... | 260/28.5 D |

FOREIGN PATENT DOCUMENTS

| | | |
|---|---|---|
| 1315968 | 5/1973 | United Kingdom . |
| 1400821 | 7/1975 | United Kingdom . |
| 1426872 | 3/1976 | United Kingdom . |
| 1518096 | 7/1978 | United Kingdom . |
| 1531872 | 11/1978 | United Kingdom . |
| 1560761 | 2/1980 | United Kingdom . |

*Primary Examiner*—Theodore E. Pertilla
*Attorney, Agent, or Firm*—Brooks, Haidt, Haffner & Delahunty

[57] ABSTRACT

Blends of chlorosulphonated polyethylene and defined bituminous material are modified by the addition of not more than 15% by weight, based on total weight of chlorine-containing synthetic elastomer, of a thermoplastic olefin polymer having a softening point in the range 110°–160° C. The incorporation of this polymer reduces shrinkage when sheets formed from the blend are exposed to heat while in use.

15 Claims, No Drawings

POLYMER/BITUMINOUS MATERIAL BLENDS, PROCESS FOR MAKING ARTICLES FROM SUCH BLENDS AND ARTICLES MADE BY THE PROCESS

The present invention relates to improved elastomer compositions, the process for forming such compositions into articles, and to the articles obtained from the compositions.

Blends of certain elastomers with bituminous materials are less expensive than the polymers themselves but still retain useful properties. In particular these blends have properties which make them particularly suitable fo use in the form of membranes or sheets for example for water-proofing purposes. The most convenient method of forming sheet from these compositions is to heat the composition and form the sheets between rollers for examples as in calendering or as in roller die extrusion. However, considerable problems have arisen when attempting to use these compositions for the purpose of forming sheets between rollers because internal stresses produced during the sheet forming process cause shrinkage when the sheet becomes warm in use e.g. when a roof covered with the sheet is heated by the sun.

The shrinkage can be reduced by holding the sheet after it has been formed at elevated temperatures to anneal it. This increases production time and it would be desirable to be able to reduce the shrinkage of the sheet after formation so reducing annealing times and thus production costs.

GB 1,531,872 discloses a blend of chlorosulphonated polyethylene and a material known as hardened extract made by blowing a gas containing oxygen at elevated temperatures through an aromatic material obtained by solvent extraction of certain products of petroleum refining. The blend may contain chlorinated polyethylene and minor properties of thermoplastics such as PVC (polyvinyl chloride) and EVA (ethylene-vinyl acetate copolymers). Sheets may be formed from the blend by calendering.

No information is given on the quantities of such further polymers. There is no suggestion that the nature of the polymer is critical. If the polymer is to have any substantial effect on such properties as tensile strength or elongation at break substantial quantities will need to be incorporated into the blend. It will not be worthwhile to add small quantities of polymer if no improvement in properties is to be expected.

The only ethylene copolymer mentioned (ethylene/-vinyl acetate copolymer) is one which usually has a low softening temperature.

It is disclosed in GB 1,518,096 that blends of chlorinated polyethylene and hardened extract may contain minor amounts (defined as less than 50% weight) of certain other polymers e.g. polyethylene, polypropylene. There is no suggestion that the type of polyethylene or polypropylene is in any way critical. No reason is given for adding the other polymers. The person skilled in the art would therefore believe that these other polymers were added to impart to the blend some of the physical properties of the added polymer. In order to have any noticeable effect on the physical properties of the blend such as tensile strength etc, it will be necessary to add substantial quantities of the polymer. It will be apparent to those skilled in the art that the addition of very small quantities of other polymers should be avoided as such addition will complicate the manufacturing process but would not be expected to give any benefit.

GB 1,400,821 discloses blends of bitumen, a compatible synthetic polymer e.g. chlorosulphonated polyethylene, and a fibrous reinforcing filler. The blend may contain other polymers. The chlorosulphonated polyethylene preferably constitutes from 55% to 75% by weight of the total synthetic polymer.

Examples of polymers which may be used in combination with chlorosulphonated polyethylene are said to be ethylene polymers e.g. ethylene-propylene copolymers and terpolymers such as ethylene-propylene diene terpolymers. The use of high and low density polyethylene is mentioned. Atactic propylene may also be incorporated in the blend. The specification states that the use of atactic polypropylene which is a soft waxy material with a low softening point improves the processability of the composition thus enabling greater throughput in production of sheet from the blend. The atactic polypropylene is here acting as a low melting plasticiser giving a more fluid mix at low temperatures.

The use of polyethylene and the various other ethylene copolymers are said to enhance the processability of the composition and the toughness of the sheet product formed from it. If the polyethylene is to improve processability in the same way as atactic polypropylene it will be necessary to use a polyethylene with a low softening point. If the polyethylene is to have any significant effect on the toughness of the sheet it will be necessary to add substantial quantities to the blend.

It should be noted that GB 1,400,821 relates to compositions containing fibrous reinforcing fillers. The shrinkage problem with sheets made with fibrous reinforcement is not usually a serious one. However it is desirable to be able to avoid the use of fibrous reinforcement in order to simplify the manufacturing process.

GB 1,426,872 discloses a blend of chlorosulphonated polyethylene bitumen and fibrous reinforcing filler. Other synthetic elastomeric or thermoplastic polymeric material may be present but the chlorosulphonated polyethylene preferably constitutes the major part of the polymeric material. A mixture of chlorosulphonated polyethylene with ethylene vinyl acetate copolymer in a weight ratio of 3:1 to 5:4 is mentioned. The minimum level of additional polymer envisaged is clearly quite high. This is not surprising as the prior art gives no reason for adding small quantities of polymer.

GB 1,315,968 discloses blends of bitumen and ethylene propylene ethylidene norbornene terpolymer. The composition may also contain one or more other polymers e.g. polyethylene, chloroprene. No reason is given for the addition of such polymers and there is no suggestion that the nature of the polyethylene is in any way critical. Substantial quantities of these polymers will be needed if the major physical properties of the blend is to be affected.

FR 2,149,112 discloses structures made from blends of bitumen and polymers. The polymers may be olefin polymers e.g. polyethylene polypropylene or elastomers. A mixture of bitumen, atactic polypropylene and styrene butadiene rubber is disclosed. Atactic polypropylene, as stated above, is a low softening point material.

We have now surprisingly found that the incorporation of small quantities of specially selected olefin polymers into blends of certain elastomers with bituminous material reduces the problem of shrinkage.

According to the present invention there is provided a composition which comprises a blend of chlorosulphonated polyethylene, and a bituminous material of softening point in excess of 80° C. and an asphaltene content in excess of 20% by weight, characterised in that it contains a thermoplastic olefin polymer having a softening temperature in the range 110°–160° C., the quantity of thermoplastic olefin polymer being not more than 15% by weight of the total weight of chlorine-containing synthetic elastomer present in the blend.

According to a further aspect of the present invention there is provided a process wherein a sheet is formed between rollers from a composition comprising a blend of chlorosulphonated polyethylene, a bituminous material having a softening point in excess of 80° C. and an asphaltenes content in excess of 25% by weight characterised in that the blend contains a thermoplastic olefin polymer having a softening temperature in the range of 110°–160° C. in a quantity which is not more than 15% by weight of the total weight of synthetic chlorine-containing elastomer.

The softening point for the bituminous material is determined by the ring and ball test used to measure the softening points of bitumens and is described in Chapter 13, page 12 of "Petroleum Products Handbook" edited by Guthrie and published 1960 by McGran Hill.

The softening temperature for the thermoplastic olefin polymer is determined in accordance with British Standard BS 2782 Method 120 A 150 R 306. This corresponds to the VICAT softening temperature determined with a 1 kg load. The softening temperature of thermoplastics is determined by a test in which a weighted needle rests on the surface being tested. The temperature at which the needle penetrates a given distance into the material gives the softening temperature. It should be noted that where this test is applied to elastomers (such as ethylene/propylene/diene monomer elastomers) penetration takes place at ambient temperature so that for the purposes of this test the elastomers have softening points below ambient temperature. Such elastomers may superficially appear quite similar in composition to the thermoplastic olefin polymers used in the process of the present invention but are in reality quite different.

Chlorosulphonated polyethylene

The blend contains chlorosulphonated polyhethylene.

Chlorosulphonated polyethylene elastomers are made by treating polyethylene with chlorine and sulphur dioxide to give a product containing —Cl and —SO$_2$Cl groups. Chlorosulphonated polyethylene elastomers are commercially available under the trade name "Hypalon" from E. I. DuPont de Nemours & Co. Inc. Information on these polymers is given in Volume 7 page 6 and line 5 of "Encyclopedia of Chemical Technology" edited by Kirk Othmer Second Edition.

Chlorinated polyethylene

The blend preferably contains a second synthetic chlorine containing elastomer namely chlorinated polethylene.

Chlorinated polyethylene elastomers are made by treating polyethylene with chlorine. The chlorinated polyethylene may for example have a chlorine content of from 20 to 48% by weight.

It is preferred to use chlorinated polyethylene based on high density polyethylene having chlorine contents of from 25 to 40% by weight chlorine.

The Bituminous Material

Various petroleum derivatives are available which have characteristics similar to bitumen and which have the required softening point and asphaltenes content. They include certain blown bitumens, i.e. bitumens which have been modified by blowing in air at elevated temperatures and blown propane precipitated asphalt. However, it is preferred to use "hardened extract". Hardened extracts are defined, and the difference between hardened extract and bitumen explained in British Pat. No. 1,560,761 (corresponding to Belgian Pat. No. 863,660) the disclosure of which is incorporated by reference.

Hardened extract is a material obtained by blowing a gas containing free oxygen into a petroleum extract at elevated temperatures, the petroleum extract having been obtained by the solvent extraction of a product of petroleum refining which is a distillate petroleum fraction or a de-asphalted petroleum residue or of a blend of this de-asphalted residue and distillate, which product boils above 350° C. at atmospheric pressure and which contains a major proportion of aromatic hydrocarbons.

The bituminous material preferably has a softening point of at least 100° C., and preferably has an asphaltenes content of at least 25% wt/wt.

The thermoplastic olefin polymer

The thermoplastic polymer must have a softening temperature in the range 110° C.–160° C., preferably to 115°–145° C., more preferably 120°–130° C.

The thermoplastic olefin polymers of the present invention are to be distinguished from the chlorinated and chlorosulphonated olefin elastomers by their elevated softening temperatures which is evidence of a certain element of crystallinity in their structures. Chlorosulphonated and chlorinated polyethylene cannot usefully be characterised by VICAT softening temperatures.

The thermoplastic olefin polymers of the present invention are distinguished by their higher softening point from the wax like materials of lower molecular weight which can be produced by certain processes of olefin polymerisation.

The thermoplastic olefin polymer may be a homopolymer or a copolymer with other copolymerisable monomers. Where the polymer is a copolymer the nature, quantity and distribution of the units in the polymer chain will affect the balance between crystalline and amorphous characteristics in the polymer and hence the softening point of the polymer. It is therefore preferred that any copolymer used is a block copolymer rather than one having units derived from the comonomer scattered randomly throughout the polymer chain.

Examples of suitable comonomers are the olefins themselves.

Examples of suitable olefin polymers are homopolymers of ethylene and propylene and their copolymers with each other and other monomers.

Where the polymer is an ethylene polymer it may for example be a high density ethylene polymer.

Examples of suitable polymers are the high density ethylene/propylene copolymer sold by BP Chemicals under the designation Rigidex Type 40 and the high density ethylene polymer sold under the designation Rigidex Type 85. Another polymer which can be used is an ethylene/propylene block copolymer sold under the designation Propathene GW 703 M by ICI.

It is highly desirable for the olefin polymer to be compatible with the chlorine-containing synthetic elastomer and the bituminous material at elevated temperatures so that a homogeneous blend can be formed.

Optional additional ingredients.

The compositions of the present invention may also contain fillers that are commonly used in reinforcing rubber e.g. calcium carbonate, carbon black, titanium dioxide, clay, etc. The use of these fillers can improve tear strength of the blend. Fibrous fillers such as asbestos, cotton, polyester fibres, rayon fibres, etc., may also be used. Preferably however fibrous fillers are substantially absent from the blend.

The compositions of the present invention may also contain certain plasticisers providing these are compatible with the composition i.e., do not readily separate from the composition after being mixed with it. Examples of such plasticisers are aromatic extracts (this being the material from which hardened extract is prepared), chlorinated paraffins for example those having from 12 to 30 carbon atoms in the molecule, and esters for example di-2-ethylhexyl phthalate, epoxidised-soya bean oils and also alkyl epoxy stearates.

The composition of the present invention may contain aliphatic amines and aliphatic amides having 8 to 24 carbon atoms in the molecule to assist in reducing sticking when the composition is formed between rollers and in subsequent storage.

In addition to the chlorosulphonated polyethylene and the optional chlorinated polyethylene the blend may contain minor amounts of other elastomers.

Vulcanisation

Some of the compositions according to the invention are satisfactory without vulcanisation. If additional strength is required in the membranes formed the compositions of the present invention, vulcanising agents may be incorporated in the compositions and the membranes subjected to vulcanisation by heating. Where a sheet or membrane is to be formed between rollers from a composition containing a vulcanisation agent which vulcanises the composition when heated it is preferred to add the vulcanising agent at a late stage in the preparation of the composition on for example a Banbury mixer to avoid premature vulcanisation. The vulcanisation step can be carried out by heating the sheet formed between rollers to a temperature greater than that used in the roller forming step and which is sufficient to cause vulcanisation. Suitable vulcanisation agents for different rubbers are well known.

Compositions containing chlorosulphonated polyethylene usually give products with good properties without vulcanisation. However, polybasic metal oxides may be incorporated in such compositions to produce a slow vulcanisation at ambient temperatures in the presence of water.

Relative quantities of ingredients

The relative weights of synthetic elastomer and bituminous material used in the compositions of the present invention may vary over a wide range but preferably the weight of bituminous material present is not more than 300% of the total weight of elastomer, more preferably not more than 200%, and is preferably not less than 50% of the total weight of elastomer, more preferably not less than 75% of the total weight of elastomer.

In the preferred case where the chlorine-containing synthetic elastomer is a mixture of chlorosulphonated and chlorinated polyethylene the weight ratio of chlorosulphonated polyethylene to chlorinated polyethylene is preferably in the range 2:1 to 1:2.

The quantity of thermoplastic olefin polymer present may for example be 1% to 15%, preferably 3% to 12% by weight, more preferably 7% to 10% by weight, based on the total weight of elastomers.

The quantity of any aliphatic amine present may for example by 0.03 to 3% wt/wt, based on weight of total composition, preferably 0.1 to 1% wt/wt.

As stated above the blend may contain minor amounts of other elastomers. However the chlorosulphonated polyethylene and chlorinated polyethylene (when the latter is present) preferably constitute the major part of the total elastomer present, preferably at least 80% weight of the total elastomer.

Test A

This is a comparative Test not according to the invention.

The basic formulation used was

|  | Parts by wt |
|---|---|
| Chlorosulphonated polyethylene | 50 |
| Chlorinated polythylene | 50 |
| Hardened extract with softening point 129° C. (HE Resin 120) | 85 |
| MT Carbon black | 40 |
| Octadecylamine | 0.5 |
| Oleamide | 0.5 |
| A tin stabiliser | 0.5 |
| Antioxidant | 0.5 |

A blend of the above components was made using a Banbury mixer. The rubber and amine were mixed together for 2 minutes at up to 100° C. The hardened extract was added and mixed at up to 135° C. for for a further 10 minutes. The resulting blend was mixed on a small two roll mill and a sheet was prepared from the blend at 130° C., and allowed to cool for 4 hours. The sheet was then reheated and held at 80° C. for 2 hours then allowed to cool and the shrinkage measured.

EXAMPLE 1

An experiment was carried out as in Test A except that 5 parts by weight of the ethylene/propylene block copolymer sold by under the designation Propathene (GW 703 M) were added during the preparation of the blend.

The ethylene/propylene block copolymer had the following characteristics:
Softening Temperatures (BS 2782 Method 120 A 150 R 306): 148° C.

The results are given in the Table.

|  | Polymer Additive | | Shrinkage % 2h at 80° C. | |
|---|---|---|---|---|
| Experiment | Type | Amount | Along mill direction | Across mill direction |
| A | — | — | −13 | +3 |
| 1 | block co-polymer | 6 | −5 | +1 |

Test B

This is a comparative test not according to the invention.

The basic formulation used was

|  | parts by weight |
|---|---|
| Chlorosulphonated polythylene | 50 |
| Chlorinated polyethylene | 50 |
| Hardened extract with softening point of 140° C. and at least 20% asphaltene | 85 |
| MT Carbon black | 40 |
| Octadecylamine | 1.5 |
| Oleamide | 1.5 |
| Tin stabiliser (dioctyl tin dimaleate) | 1.5 |
| Antioxidant | 0.5 |
| Epoxidised soya bean oil (process aid) | 10 |

The above ingredients were mixed in a Banbury internal mixer to a dump temperature (the temperature at which the mixture was discharged from the mixer) of about 150° C. The compound was then mixed on a two roll mill at 140° C. for 5 minutes. A sheet about 1 mm thick was obtained. This was allowed to cool and then after several hours was reheated to 80° C. for 6 hours, cooled again and the shrinkage was then measured.

The results are shown in Table 2.

EXAMPLE 2

An experiment was carried out as in Test B but using a composition which additionally contained 10 parts by weight of a high density ethylene/propylene copolymer sold by BP Chemicals Limited under the trade name Rigidex Type 40. This polymer had the following characteristics:

Softening temperature (VICAT) 1 kg load: 123° C.

The results are given in Table 2.

EXAMPLE 3

An experiment was carried out as in Example 2 but using 10 parts by weight of a high density ethylene propylene copolymer(?) sold by BP Chemicals Limited under the trade name Rigides Type 85.

This polymer had the following characteristics:
Softening temperature (VICAT 1 kg load): 123° C.
The results are given in Table 2.

Test C

This is a comparative test not according to the invention.

An experiment was carried out as in Example B but using 10 parts by weight of a low density ethylene homopolymer sold by Allied Chemicals Limited under the designation AC PE 617/A/.

This polymer had the following characteristics:
Softening temperature 98°–105° C.
The results are shown in Table 2.

TABLE 2

| Experiment | Polymer Additive Type | Polymer Additive Amount | Shrinkage % 6 h at 80° C. Along mill direction | Shrinkage % 6 h at 80° C. Across mill direction |
|---|---|---|---|---|
| B | — | — | −11 | +3 |
| 2 | HDPE | 10 | −3 | +1 |
| 3 | HDPE | 10 | −3 | +0.5 |
| C | LDPE | 10 | −10 | +0.5 |

HDPE: high density polyethylene
LDPE: low density polyethylene

We claim:

1. A composition which is a blend of chlorosulphonated polyethylene and a bituminous material of softening point in excess of 80° C. and an asphaltene content in excess of 25% by weight, characterised in that it contains a thermoplastic olefin polymer having a softening temperature in the range 110° C. to 160° C., the quantity of thermoplastic being not more than 15% by weight of the total weight of chlorine-containing synthetic elastomer present in the blend.

2. A composition according to claim 1 wherein the softening point of the bituminous material is at least 100° C.

3. A composition according to any one of claims 1 or 2 wherein the softening temperature of the thermoplastic olefin polymer is in the range 115° to 145° C.

4. A composition according to any one of the preceding claims wherein the thermoplastic olefin polymer is a high density ethylene polymer.

5. A composition according to any one of the preceding claims which contains chlorinated polyethylene.

6. A composition according to any one of the preceding claims wherein the bituminous material is a material obtained by blowing a gas containing free oxygen into a petroleum extract at elevated temperatures, the petroleum extract having been obtained by the solvent extraction of a product of petroleum refining which is a distillate petroleum fraction or a de-asphalted petroleum residue or a blend of this de-asphalted residue and distillate, which product boils above 350° C. at atmospheric pressure and which contains a major proportion of aromatic hydrocarbons.

7. A composition according to any one of the preceding claims which is substantially free of fibrous filler.

8. A composition according to any one of the preceding claims wherein the weight of bituminous material is not more than 300% of the total weight of elastomer.

9. A composition according to any one of the preceding claims where the weight of bituminous material is not more than 200% of the total weight of elastomer.

10. A composition according to any one of the preceding claims wherein the weight of bituminous material is not less than 50% of the total weight of elastomer.

11. A composition according to any one of the preceding claims wherein the weight of bituminous material is not less than 75% of the total weight of elastomer.

12. A composition according to any one of the preceding claims which contains chlorinated polyethylene and the weight ratio of chlorosulphonated polyethylene to chlorinated polyethylene is in the range 2:1 to 1:2.

13. A composition according to any one of the preceding claims wherein the quantity of thermopolastic olefin polymer having a softening point in the range 110° to 160° C. present in the composition is 1 to 15% by weight of the total weight of elastomer.

14. A composition according to claim 13 wherein the quantity of thermoplastic olefin polymer is 3 to 12% by weight of total weight of elastomer.

15. A composition according to claim 14 wherein the quantity of thermoplastic olefin polymer is in the range 7 to 10% by weight.

* * * * *